US012291902B2

(12) United States Patent
Nishizuka et al.

(10) Patent No.: US 12,291,902 B2
(45) Date of Patent: May 6, 2025

(54) DOOR OPENING/CLOSING DEVICE AND OPERATION DETECTION DEVICE, AND DOOR OPENING/CLOSING METHOD AND OPERATION DETECTION METHOD

(71) Applicants: ALPHA CORPORATION, Kanagawa (JP); NISSAN JIDOSHA KABUSHIKI KAISHA, Kanagawa (JP)

(72) Inventors: Mitsuo Nishizuka, Yokohama (JP); Takashi Ono, Yokohama (JP); Takao Toyama, Yokohama (JP)

(73) Assignees: ALPHA CORPORATION, Kanagawa (JP); NISSAN JIDOSHA KABUSHIKI KAISHA, Kanagawa (JP)

( * ) Notice: Subject to any disclaimer, the term of this patent is extended or adjusted under 35 U.S.C. 154(b) by 1304 days.

(21) Appl. No.: 16/925,451

(22) Filed: Jul. 10, 2020

(65) Prior Publication Data
US 2020/0340287 A1    Oct. 29, 2020

Related U.S. Application Data

(63) Continuation of application No. PCT/JP2019/000561, filed on Jan. 10, 2019.

(30) Foreign Application Priority Data

Jan. 11, 2018    (JP) ................................ 2018-002390

(51) Int. Cl.
*E05F 15/75*    (2015.01)
*B60J 5/06*    (2006.01)
(Continued)

(52) U.S. Cl.
CPC .............. *E05B 81/78* (2013.01); *B60J 5/06* (2013.01); *E05F 15/75* (2015.01); *G01D 5/24* (2013.01);
(Continued)

(58) Field of Classification Search
CPC .. E05B 81/78; E05F 15/75; B60J 5/06; G01D 5/24
(Continued)

(56) References Cited

U.S. PATENT DOCUMENTS 9,845,623 B1\*  12/2017  Gage ...................... B60R 25/24
2007/0126246 A1\*  6/2007  Suzuki ............... G07C 9/00309
292/336.3
(Continued)

FOREIGN PATENT DOCUMENTS

CN    101023232 A    8/2007
CN    101092863 A    12/2007
(Continued)

OTHER PUBLICATIONS

An Office Action mailed by China National Intellectual Property Administration on Aug. 2, 2021, which corresponds to Chinese Patent Application No. 201980008075.5 and is related to U.S. Appl. No. 16/925,451; with English language translation.
(Continued)

*Primary Examiner* — Yong Hang Jiang
(74) *Attorney, Agent, or Firm* — Studebaker Brackett PLLC

(57) ABSTRACT

A door opening/closing device includes an operation handle, a detection unit provided in the operation handle and configured to detect a contact state of a user with the operation handle, a door driving unit configured to open or close a door, and a control unit. The control unit is configured to determine that a first operation involving a direction is a user
(Continued)

operation in which a user comes into contact with the operation handle, when the detection unit detects the first operation and a second operation. The control unit is configured to control the door driving unit and open or close the door based on the user operation.

8 Claims, 4 Drawing Sheets

(51) Int. Cl.
    *E05B 81/78*     (2014.01)
    *G01D 5/24*     (2006.01)
    *E05B 81/00*     (2014.01)
    *E05F 15/643*     (2015.01)

(52) U.S. Cl.
    CPC ............ *E05B 81/00* (2013.01); *E05F 15/643* (2015.01); *E05Y 2400/44* (2013.01); *E05Y 2400/45* (2013.01); *E05Y 2400/86* (2013.01); *E05Y 2900/531* (2013.01)

(58) Field of Classification Search
    USPC ........................................................ 340/5.72
    See application file for complete search history.

(56) References Cited

U.S. PATENT DOCUMENTS

| | | |
|---|---|---|
| 2007/0171057 A1 | 7/2007 | Ogino et al. |
| 2007/0290796 A1 | 12/2007 | Teshima et al. |
| 2008/0061933 A1 | 3/2008 | Ieda et al. |
| 2008/0290668 A1* | 11/2008 | Ieda ........................ E05B 81/78 292/198 |
| 2009/0021112 A1 | 1/2009 | Kondou et al. |
| 2014/0164186 A1* | 6/2014 | Lee .................... G06Q 30/0623 705/26.61 |
| 2014/0303852 A1* | 10/2014 | Seki ........................ E05F 15/40 701/49 |
| 2015/0025751 A1* | 1/2015 | Sugiura .................... B60J 5/101 701/49 |
| 2015/0120151 A1* | 4/2015 | Akay ...................... B60R 25/01 701/1 |
| 2015/0376930 A1 | 12/2015 | Scholz et al. |
| 2016/0281410 A1 | 9/2016 | Schanz et al. |
| 2016/0291832 A1 | 10/2016 | Ogawa et al. |
| 2016/0349850 A1 | 12/2016 | Tsuda |
| 2017/0255771 A1 | 9/2017 | Miyakawa |

FOREIGN PATENT DOCUMENTS

| | | | |
|---|---|---|---|
| CN | 101144350 A | 3/2008 | |
| DE | US-20150120151 A1 * | 4/2015 | ............. B60R 25/01 |
| DE | 10 2014 009 714 A1 | 12/2015 | |
| DE | 10 2016 204 860 A1 | 9/2016 | |
| GB | 2 418 741 A | 4/2006 | |
| JP | 3133182 U | 7/2007 | |
| JP | 2009079353 A | 4/2009 | |
| JP | 2015-184841 A | 10/2015 | |
| JP | 2017-033528 A | 2/2017 | |
| JP | 2017156966 A | 9/2017 | |
| JP | 2017172140 A | 9/2017 | |
| JP | 2017-199200 A | 11/2017 | |
| JP | 2018-105025 A | 7/2018 | |
| KR | 10-2015-0026131 A | 3/2015 | |

OTHER PUBLICATIONS

The extended European search report issued by the European Patent Office on Sep. 3, 2021, which corresponds to European Patent Application No. 19738050.4-1005 and is related to U.S. Appl. No. 16/925,451.
An Office Action; "Notice of Reasons for Refusal," mailed by the Japanese Patent Office on Aug. 24, 2021, which corresponds to Japanese Patent Application No. 2018-002390 and is related to U.S. Appl. No. 16/925,451 with English translation.
International Search Report issued in PCT/JP2019/000561; mailed Mar. 19, 2019.
An Office Action; "Notice of Reasons for Refusal", mailed by the Japanese Patent Office on Jan. 17, 2023, which corresponds to Japanese Patent Application No. 2022-021217 and is related to U.S. Appl. No. 16/925,451; with English language translation.
International Preliminary Report on Patentability and Written Opinion issued in PCT/JP2019/000561; issued Jul. 14, 2020.

* cited by examiner

DOOR OPENING/CLOSING DEVICE AND OPERATION DETECTION DEVICE, AND DOOR OPENING/CLOSING METHOD AND OPERATION DETECTION METHOD

CROSS REFERENCE TO RELATED APPLICATIONS

This application is a continuation of PCT application No. PCT/JP2019/000561, which was filed on Jan. 10, 2019 based on Japanese Patent Application No. 2018-002390 filed on Jan. 11, 2018, the contents of which are incorporated herein by reference.

BACKGROUND OF THE INVENTION

Field of the Invention

The present invention relates to a door opening/closing device and an operation detection device, and a door opening/closing method and an operation detection method.

Description of Related Art

In the related art, there is a technique of unlocking a door triggered by a user by touching an operation handle provided on a door of an automobile. An electrostatic capacitance sensor is mounted on the operation handle to detect a human body that comes into contact with or approaches the operation handle by utilizing a change in electrostatic capacitance.

Further, for example, Patent Literature 1 discloses a touch switch device for an automatic sliding door connected to a control unit that controls opening/closing of an automatic sliding door of an automobile. In this device, a switch mechanism unit for generating a signal for opening/closing the automatic sliding door of the automobile is composed of an electrostatic capacitance type touch switch. The sliding door is opened and closed by a touch operation by detecting contact with an operation handle of the door as a change in electrostatic capacitance.

[Patent Literature 1] JP-B-3133182

In the method disclosed in Patent Literature 1, when a user or another person passes near an operation unit, an arm and the like unintentionally touch the operation unit, resulting in erroneous detection of the contact as a user operation.

SUMMARY

One or more embodiments provide a highly reliable door opening/closing device and an operation detection device, and a highly reliable door opening/closing method and an operation detection method.

In an aspect (1), one or more embodiments provide a door opening/closing device including an operation handle, a detection unit provided in the operation handle and configured to detect a contact state of a user with the operation handle, a door driving unit configured to open or close a door, and a control unit. The control unit is configured to determine that a first operation involving a direction is a user operation in which a user comes into contact with the operation handle, when the detection unit detects the first operation and a second operation. The control unit is configured to control the door driving unit and open or close the door based on the user operation.

In an aspect (2), the door may be a sliding door disposed on a lateral side of a vehicle and be configured to move in a vehicle front-rear direction. The operation handle may be disposed on the sliding door along the vehicle front-rear direction. The control unit may be configured to open or close the door according to the direction of the first operation.

In an aspect (3), the control unit may be configured to determine that the first operation is the user operation when the detection unit detects an interval between the first operation and the second operation is equal to or longer than a predetermined determination time.

In an aspect (4), the detection unit may include a plurality of electrostatic capacitance sensors arranged along a shape of the operation handle.

In an aspect (5), the first operation may be a swipe operation tracing a surface of the operation handle along the shape of the operation handle. The second operation may be a tap operation tapping the surface of the operation handle.

In an aspect (6), one or more embodiments provide an operation detection device including an operation unit, a detection unit provided in the operation unit and configured to detect a contact state of a user with the operation unit, and a control unit. The control unit is configured to determine that a first operation involving a direction is a user operation in which a user comes into contact with the operation unit, when the detection unit detects the first operation and a second operation.

According to one or more embodiments, even when the user's or another person's arm and the like unintentional touch the operation unit, this can be distinguished from a proper user operation. As a result, occurrence of the erroneous detection can be suppressed and a highly reliable system can be provided.

DETAILED DESCRIPTION

Figure 1:
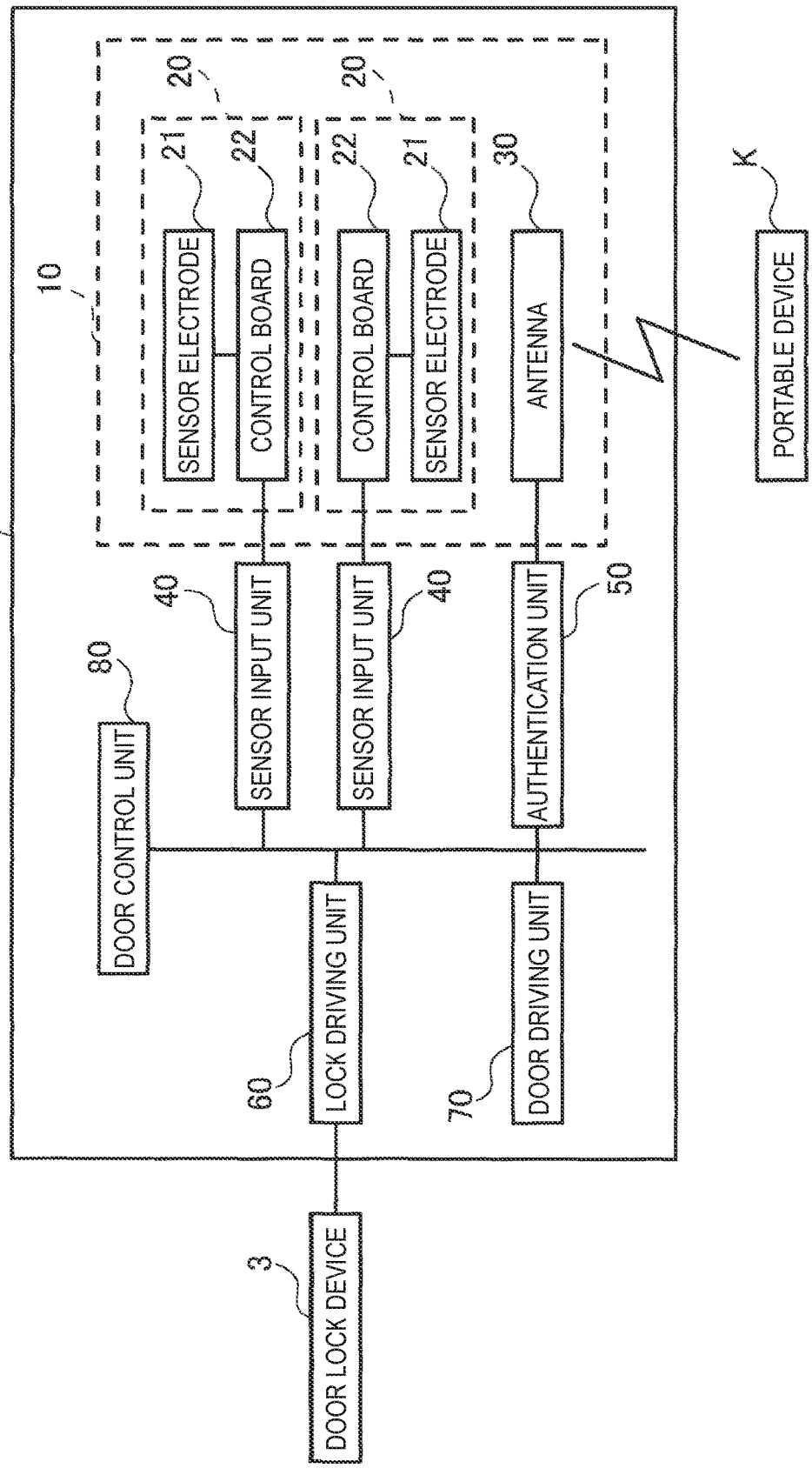
FIG. 1 is a block diagram illustrating a control configuration of a vehicle door opening/closing device.
Figure 2A:
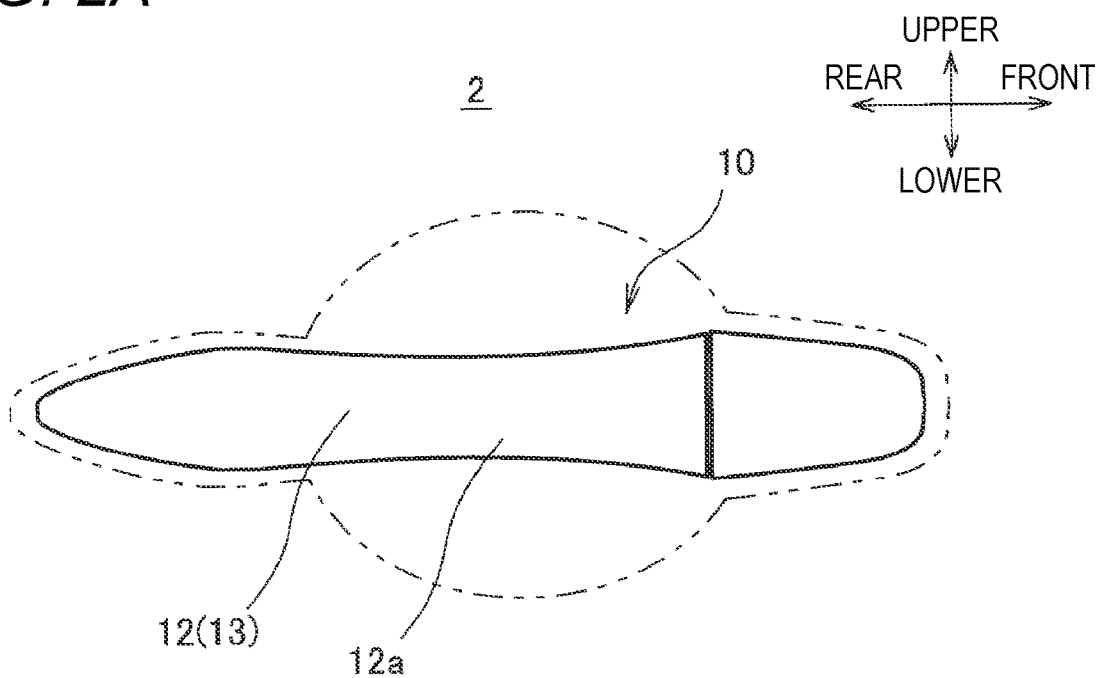
FIGS. 2A and 2B are illustrative diagrams illustrating a configuration of a door handle device mounted on a sliding door.
Figure 2B:
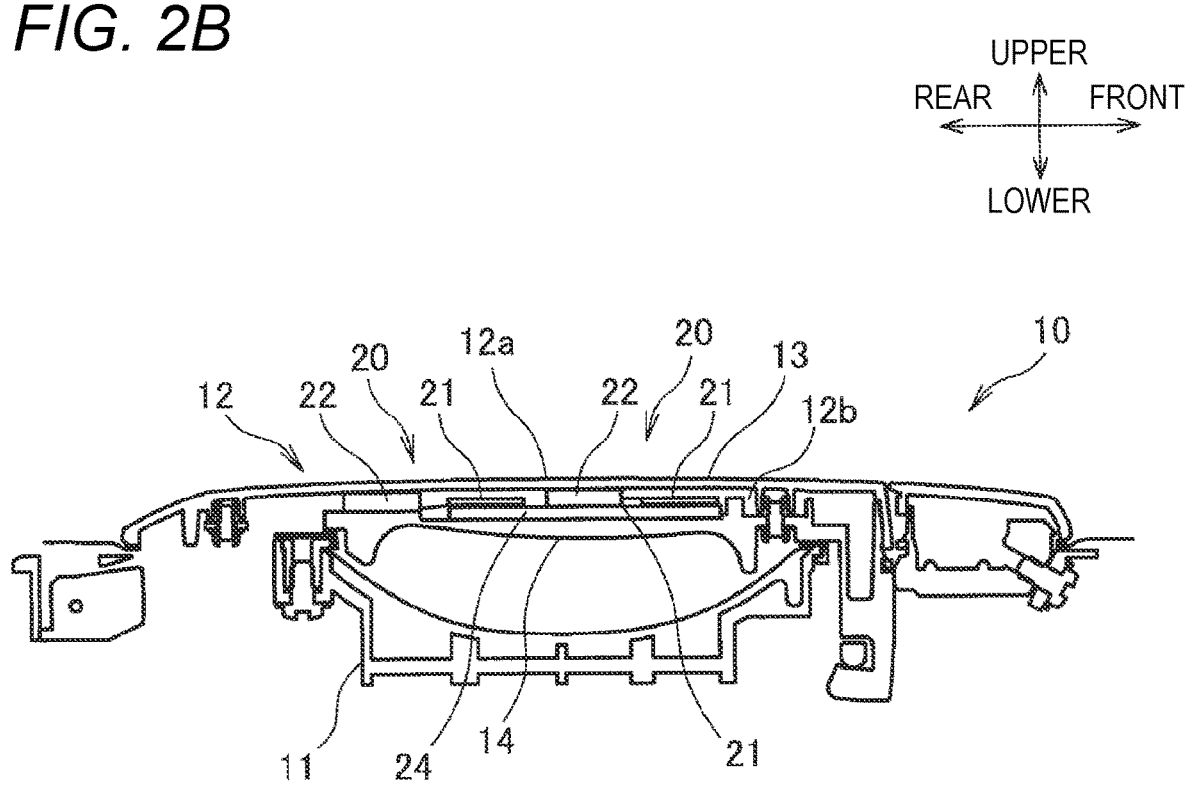

Hereinafter, a door opening/closing device according to the present embodiment will be described by exemplifying a vehicle door opening/closing device 1. Here, FIG. 1 is a block diagram illustrating a control configuration of the vehicle door opening/closing device 1. FIGS. 2A and 2B are illustrative diagrams illustrating a configuration of a door handle device 10 mounted on a sliding door 2. FIG. 2A is a front view illustrating an outer appearance of the door handle device 10, and FIG. 2B is a view schematically illustrating a cross-sectional state of the door handle device 10.

The vehicle door opening/closing device 1 is a device that controls opening/closing of the sliding door 2 provided in a vehicle. The sliding door 2 is supported on a side surface of a vehicle body, and moves in a vehicle front-rear direction to open or close a door opening provided on the side surface of the vehicle body. The sliding door 2 is fully closed in a state of being positioned at the foremost position, and is fully opened in a state of being positioned at the rearmost position. The sliding door 2 is provided with a door lock device 3. The door lock device 3 is a device that maintains the sliding door 2 in a locked state. On the other hand, in an unlocked state, the sliding door 2 can be moved in an opening direction.

The vehicle door opening/closing device 1 mainly includes a door handle device 10, sensor input units 40, an authentication unit 50, a lock driving unit 60, a door driving unit 70, and a door control unit 80.

The door handle device 10 is disposed on the sliding door 2. The door handle device according to the present embodiment is a door outside handle device disposed on an outer side of the sliding door 2. The door handle device 10 includes a handle base 11 fixed to the sliding door 2, and an operation handle 12 connected to the handle base 11, and is assembled to the sliding door 2 in a posture along the vehicle front-rear direction.

The operation handle 12 has a shape that is long in the vehicle front-rear direction. A grip portion 12a for the user to grip the operation handle 12 is provided at a central portion of the operation handle 12. The grip portion 12a is separated from an outer surface of the sliding door 2 so as to form a space for inserting a hand. As one of the features of the present embodiment, the operation handle 12 functions as an operation unit that allows a user to perform a contact operation on a surface of the operation handle 12 when the sliding door 2 is opened or closed. However, the operation handle 12 also has a general handle function and also functions as an operation unit that allows the user to grip and rotate the operation handle 12 when the sliding door 2 is opened or closed.

The operation handle 12 is constituted by fitting a front cover 13 constituting the front surface thereof and a back cover 14 constituting a back surface of the front cover 13. A hollow portion 12b is formed between the front cover 13 and the back cover 14. The front cover 13 and the back cover 14 are formed of, for example, a synthetic resin material in order to reduce weight and enable wireless communication by an antenna 30 to be described below.

The door handle device 10 further includes two electrostatic capacitance sensors 20, an antenna 30, and the like. The two electrostatic capacitance sensors 20, the antenna 30, and the like are accommodated in the hollow portion 12b of the operation handle 12. These electronic components are electrically connected to a harness for external connection, and the harness is drawn out from the operation handle 12 to the outside and connected to a vehicle side.

The two electrostatic capacitance sensors 20 detect a contact state (including an approaching state) of the user with the operation handle 12. These electrostatic capacitance sensors 20 are mounted on the back cover 14 and disposed on a back surface side of the front cover 13. In the present embodiment, a swipe operation tracing the operation handle 12 (the front cover 13) with a finger along the shape thereof, that is, along a longitudinal direction of the operation handle 12, is adopted as one of the user operations. The two electrostatic capacitance sensors 20 are arranged at an interval in the longitudinal direction of the operation handle 12, so that the swipe operation and a direction thereof can be detected.

Each of the electrostatic capacitance sensors 20 mainly includes a sensor electrode 21 and a control board 22.

The sensor electrode 21 detects a change in the electrostatic capacitance in accordance with the contact of the human body with the operation handle 12. An insulating spacer 24 is provided between the sensor electrodes 21 and the back cover 14. The sensor electrode 21 is connected to the control board 22, and a driving voltage is applied at a predetermined cycle.

The control board 22 detects the contact state of the user with the operation handle 12 based on a change in the electrostatic capacitance of the sensor electrode 21. The information detected by the control board 22 is output to the sensor input unit 40.

The antenna 30 communicates with a portable device K carried by the user.

The sensor input unit 40 is connected to the electrostatic capacitance sensor 20 and monitors an output from the capacitance sensor 20. When there is an output from the electrostatic capacitance sensor 20, the sensor input unit 40 outputs the output to the door control unit 80.

The authentication unit 50 is connected to the antenna 30 and operates under the control of the door control unit 80. The authentication unit 50 can communicate with the portable device K carried by the user via the antenna 30. Upon receiving unique ID information transmitted from the portable device K, the authentication unit 50 collates this ID information with an ID stored in advance (authentication processing). If this ID information matches the ID stored in advance, the authentication unit 50 outputs information indicating the establishment of the authentication to the door control unit 80. This authentication operation is triggered by the reception of the ID information transmitted from the portable device K when the user operates a switch of the portable device K. Alternatively, when the ID information transmitted from the portable device K is received in response to an ID request signal transmitted from the authentication unit 50 via the antenna 30, the authentication operation may be triggered by the reception of the ID information.

The lock driving unit 60 is connected to the door lock device 3 and operates under the control of the door control unit 80. The lock driving unit 60 can switch between the locked state and the unlocked state by driving the door lock device 3.

The door driving unit 70 includes an actuator such as a motor and a drive mechanism such as a drive cable. The door driving unit 70 transmits a driving force generated in the actuator to the sliding door 2 via the drive mechanism, thereby moving the sliding door 2 in the opening direction or a closing direction.

The door control unit 80 integrally controls the vehicle door opening/closing device 1. The door control unit 80 controls the opening/closing of the sliding door 2 by controlling the lock driving unit 60 and the door driving unit 70 based on information input from the electrostatic capacitance sensors 20 via the sensor input units 40 and information input from the authentication unit 50. A microcomputer mainly configured with a CPU, a ROM, a RAM, and an I/O interface can be used as the door control unit 80.

Figure 3A:
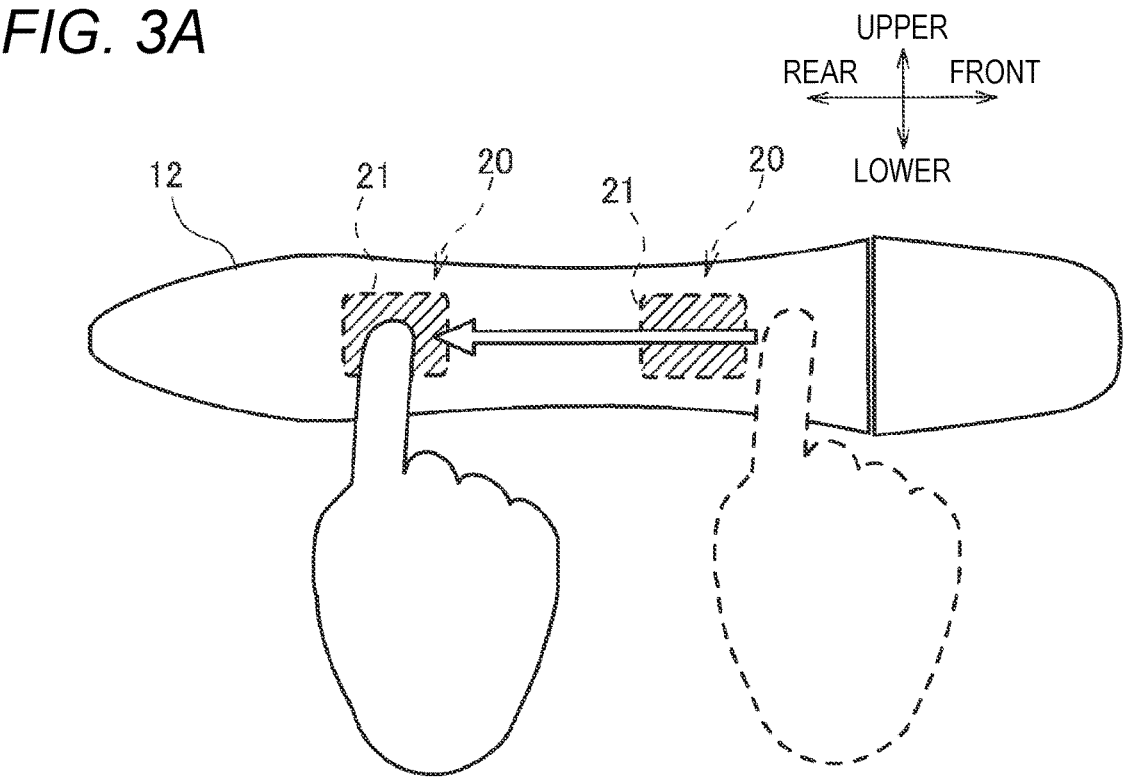
FIGS. 3A and 3B are illustrative diagrams illustrating a swipe operation and a tap operation.
Figure 3B:
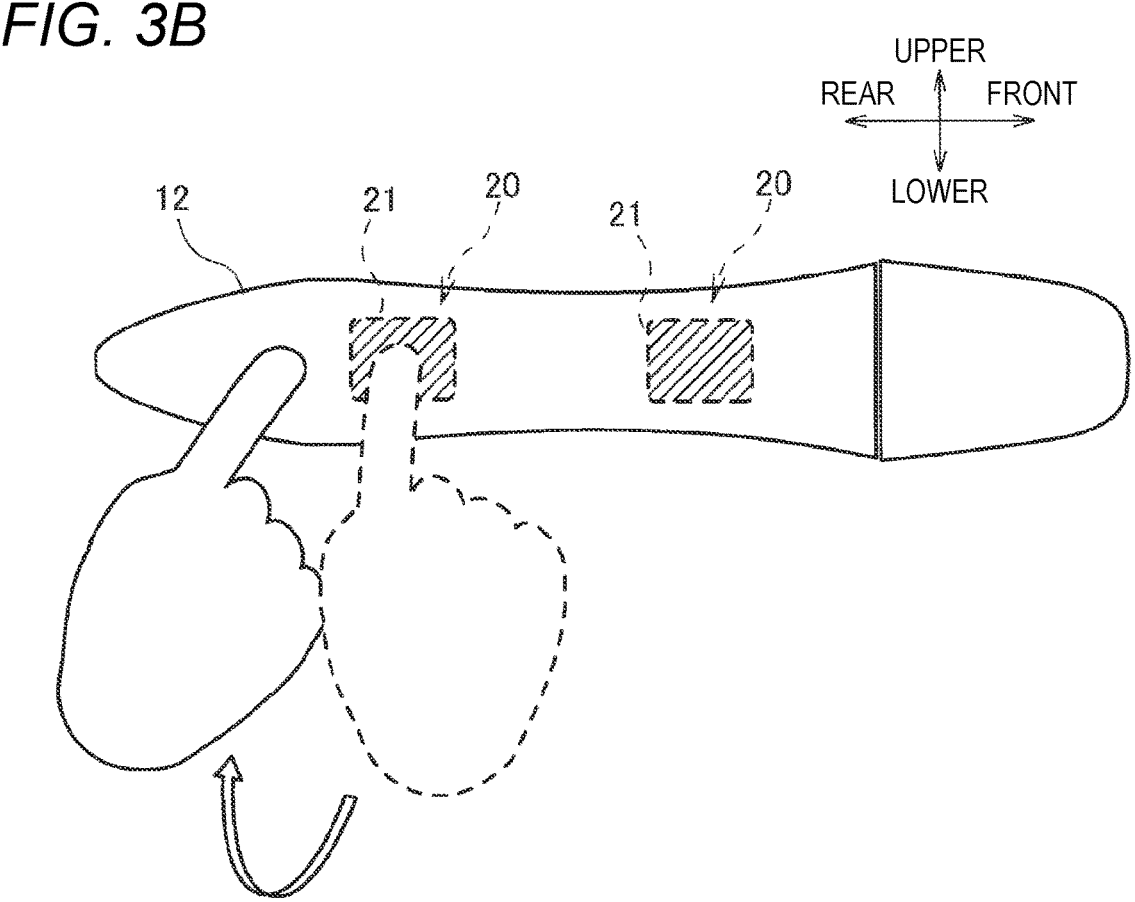

Hereinafter, a control concept of the vehicle door opening/closing device 1 according to the present embodiment will be described with reference to FIGS. 3A and 3B. FIG. 3A is an illustrative diagram illustrating the swipe operation performed on the operation handle 12, and FIG. 3B is an illustrative diagram illustrating the tap operation performed on the operation handle 12. In the present embodiment, the sliding door 2 is opened and closed by performing the swipe operation on the surface of the operation handle 12 in accordance with an opening/closing direction of the sliding door 2.

For example, if the sliding door 2 is operated in the closing direction, the swipe operation is performed on the operation handle 12 in the closing direction of the sliding door 2. When the swipe operation is performed in the closing direction of the sliding door 2, a finger of the user moves from the rear to the front on the surface of the operation handle 12. At this time, the finger of the user sequentially passes the two electrostatic capacitance sensors 20. Therefore, after the contact of the user is detected in the rear electrostatic capacitance sensor 20, the contact of the user is detected in the front electrostatic capacitance sensor 20. Therefore, when the sensor outputs of the two electrostatic capacitance sensors 20 are monitored, the swipe operation performed on the operation handle 12 from the rear to the front can be detected from these detection results.

On the other hand, if the sliding door 2 is operated in the opening direction, the swipe operation is performed on the operation handle 12 in the opening direction of the sliding door 2. When the swipe operation is performed in the opening direction of the sliding door 2, the finger of the user moves from the front to the rear on the surface of the operation handle 12. In this case, after the contact of the user is detected in the front electrostatic capacitance sensor 20, the contact of the user is detected in the rear electrostatic capacitance sensor 20. Therefore, when the sensor outputs of the two electrostatic capacitance sensors 20 are monitored, the swipe operation performed on the operation handle 12 from the front to the rear can be detected from these detection results.

Meanwhile, when the user passes the lateral side of the vehicle or when another person passes the lateral side of the vehicle in a state where the user is near the vehicle (that is, the state where the authentication is established), the arm or the like may touch the operation handle 12 unintentionally. Therefore, there is a possibility that the contact of the user is continuously detected in the two electrostatic capacitance sensors 20. In this case, the door control unit 80 erroneously detects the outputs of the two electrostatic capacitance sensors 20 as the swipe operation.

Therefore, in the present embodiment, in order to suppress such erroneous detection, a user is requested to perform the tap operation for determining the swipe operation after the swipe operation. This is because, even if a reaction similar to the swipe operation appears when the user or another person passes the lateral side of the vehicle, the electrostatic capacitance sensors 20 do not react thereafter as long as the user or the other person passes the vehicle. Therefore, by using the tap operation as the user's intention to perform the swipe operation, a true swipe operation and the reaction similar to the swipe operation are distinguished from each other.

Further, in the present embodiment, it is also required that the hand is released from the operation handle 12 for a certain period of time or more in a transition from the swipe operation to the tap operation. By this request, it is distinguished whether a series of operations from the swipe operation to the tap operation (or sensor output similar to these operations) occurred accidentally or definitely wider the intention of the user.

As described above, the door control unit 80 according to the present embodiment determines the validity of the user operation by a two-step operation including the swipe operation and the tap operation. Specifically, the door control unit 80 determines that the swipe operation is the user operation under the condition that the swipe operation and the tap operation are detected. Then, the door control unit 80 controls the door driving unit 70 based on the determined user operation, and opens and closes the sliding door 2.

Figure 4:
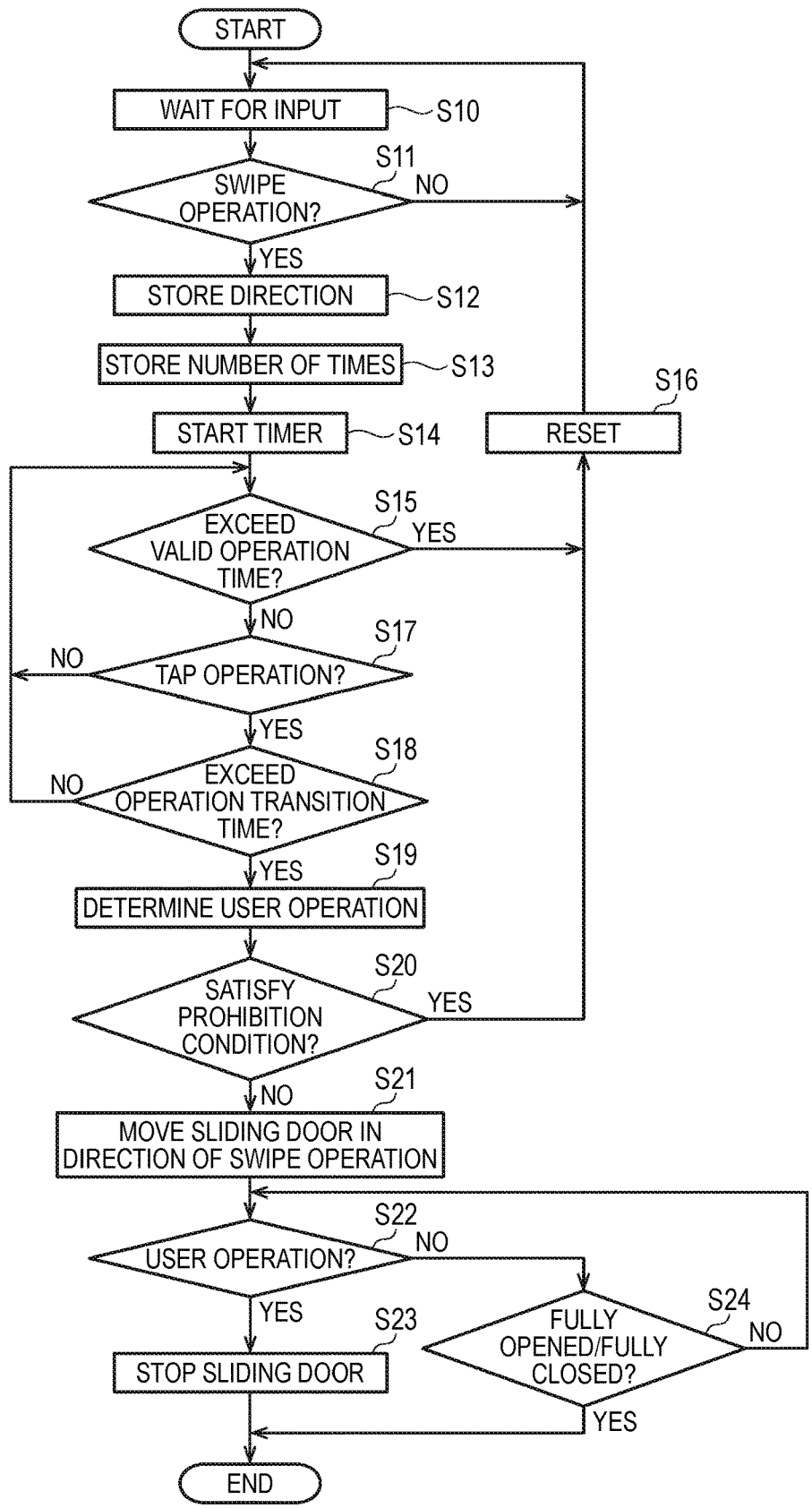
FIG. 4 is a flowchart illustrating a flow of an opening/closing operation of the sliding door performed by the vehicle door opening/closing device.

Next, an opening/closing operation of the sliding door 2 performed by the vehicle door opening/closing device 1 according to the present embodiment will be described. FIG. 4 is a flowchart illustrating a flow of the opening/closing operation of the sliding door 2 performed by the vehicle door opening/closing device 1. Processing shown in the flowchart is executed by the door control unit 80.

First, in step S10, the door control unit 80 waits for an input from the two electrostatic capacitance sensors 20. When there is an input from any one of the electrostatic capacitance sensors 20, standby processing is terminated, and the processing proceeds to step S11.

In step S11, the door control unit 80 determines whether the swipe operation has been performed. This means that, after the contact of the user is detected in the rear electrostatic capacitance sensor 20, in a case where the contact of the user is detected in the front electrostatic capacitance sensor 20, and these detections are continuously performed, the swipe operation from the rear to the front is performed. Conversely, this means that, after the contact of the user is detected in the front electrostatic capacitance sensor 20, in a case where the contact of the user is detected in the rear electrostatic capacitance sensor 20, and these detections are continuously performed, the swipe operation from the front to the rear is performed. The door control unit 80 monitors the sensor outputs of the two electrostatic capacitance sensors 20, and makes a determination in step S11.

When the swipe operation is performed, an affirmative determination is made in step S11, and the processing proceeds to step S12. On the other hand, when a user operation other than the swipe operation is performed, a negative determination is made in step S11, and the processing returns to step S10.

In step S12, the door control unit 80 stores a direction of the swipe operation.

In step S13, the door control unit 80 stores the number of times of the user operation. When the swipe operation is detected for the first time, in step S13, the number of times of the operation is stored as a first operation.

In step S14, the door control unit 80 starts a timer.

In step S15, the door control unit 80 refers to a count value of the timer, and determines whether the count value exceeds a valid operation time. The valid operation time is an upper limit time for determining that these operations are performed in a series of operations of the user with the fact that these operations are performed within a certain period of time from the swipe operation to the tap operation, and the optimum value is set in advance through experiments and simulations. The valid operation time is set to be longer than an operation transition time to be described later.

When the count value of the timer exceeds the valid operation time, an affirmative determination is made in step S15, and the processing proceeds to step S16. On the other hand, when the count value of the timer does not exceed the valid operation time, a negative determination is made in step S15, and the processing proceeds to step S17.

In step S16, the door control unit 80 resets the stored direction of the swipe operation, the number of times of the user operation and the count value of the timer. Then, the processing returns to step S10.

In step S17, the door control unit 80 determines whether the tap operation has been performed. When the user performs the tap operation on a front side of the operation handle 12, the contact of the user is detected in the front electrostatic capacitance sensor 20 for a certain period of time. Similarly, when the user performs the tap operation on a rear side of the operation handle 12, the contact of the user is detected in the rear electrostatic capacitance sensor 20 for a certain period of time. Alternatively, when the user performs the tap operation on the center of the operation handle 12, the contact of the user is detected in the front electrostatic capacitance sensor 20 and the rear electrostatic capacitance sensor 20 at the same time for a certain period of time. The door control unit 80 monitors the sensor outputs of the two electrostatic capacitance sensors 20, and determines whether the tap operation has been performed.

When the tap operation is performed, an affirmative determination is made in step S17, and the processing proceeds to step S18. On the other hand, when a user operation other than the tap operation is performed, a negative determination is made in step S17, and the processing returns to step S15.

In step S18, the door control unit 80 refers to a count value of the timer, and determines whether the count value exceeds the operation transition time. The operation transition time is a determination time for determining whether the hand is released from the operation handle 12 for a certain period of time or more in the transition from the swipe operation to the tap operation.

When the count value of the timer exceeds the operation transition time, an affirmative determination is made in step S18, and the processing proceeds to step S19. On the other hand, when the count value of the timer does not exceed the operation transition time, a negative determination is made in step S18, and the processing returns to step S15.

In step S19, the door control unit 80 determines that the swipe operation determined in step S11 is the user operation.

In step S20, the door control unit 80 determines whether the direction of the swipe operation satisfies a prohibition condition. For example, when the sliding door 2 is fully closed, the sliding door 2 cannot be moved in the closing direction. Therefore, when the sliding door 2 is fully closed, a swipe operation in the closing direction, that is, the swipe operation from the rear to the front is a prohibition condition. Similarly, when the sliding door 2 is fully opened, the sliding door 2 cannot be moved in the opening direction. Therefore, when the sliding door 2 is fully opened, a swipe operation in the opening direction, that is, the swipe operation from the front to the rear is a prohibition condition. Therefore, the door control unit 80 determines whether the prohibition condition is satisfied based on the state of the sliding door 2 and the direction of the swipe operation.

If an affirmative determination is made in step S20, that is, if the direction of the swipe operation satisfies a prohibition condition, the processing proceeds to step S16. On the other hand, if a negative determination is made in step S20, that is, if the direction of the swipe operation does not satisfy the prohibition condition, the processing proceeds to step S21.

In step S21, the door control unit 80 controls the door driving unit 70 based on the direction of the swipe operation. Accordingly, the sliding door 2 is driven by the door driving unit 70, and the sliding door 2 is moved in the direction of the swipe operation. For example, when the swipe operation from the rear to the front is performed, the door control unit 80 determines that there is a swipe operation in the closing direction, and moves the sliding door 2 in the closing direction. On the other hand, when the swipe operation from the front to the rear is performed, the door control unit 80 determines that there is a swipe operation in the opening direction, and moves the sliding door 2 in the opening direction.

In step S22, the door control unit 80 monitors the sensor outputs of the two electrostatic capacitance sensor 20, and determines whether a user operation is performed on the operation handle 12. In the determination in step S22, all the user operations including the non-swipe operation regardless of the swipe operation are targeted.

When an affirmative determination is made in step S22, that is, when the user operation is performed on the operation handle 12, the processing proceeds to step S23. On the other hand, when a negative determination is made in step S22, that is, when the user operation is not performed on the operation handle 12, the processing proceeds to step S24.

In step S23, the door control unit 80 controls the door driving unit 70 to stop the sliding door 2.

In step S24, the door control unit 80 determines whether the sliding door 2 is fully closed or fully opened. Specifically, when the sliding door 2 moving in the closing direction reaches the fully closed state or when the sliding door 2 moving in the opening direction reaches the fully open state, an affirmative determination is made in step S24, and the present routine is ended. On the other hand, when the sliding door 2 is not fully closed or fully opened, a negative determination is made in step S24, and the processing returns to step S22.

Through such a series of processing, the door control unit 80 performs opening/closing control of the sliding door 2.

In the above description of the flowchart, when the sliding door 2 is fully closed at the start of the processing, it is assumed that the door lock device 3 is in the unlocked state. However, even when the sliding door 2 is in the locked state, the flow of the processing is basically the same, but is different in that the following processing is added. Specifically, after the standby processing (step S10) is completed, the door control unit 80 controls the authentication unit 50 to perform the authentication processing, and after the authentication is established, the processing proceeds to step S11 and subsequent steps. Further, in step S21, the door control unit 80 controls the lock driving unit 60 to switch the door lock device 3 to the unlocked state prior to the control of the door driving unit 70.

Further, in a state in which the sliding door 2 is moved to the fully closed state, the door lock device 3 can be switched to the locked state through an operation of the switch of the portable device K or a request switch mounted on the door handle device 10.

The processing shown in the flowchart described above is not limited to the case where the sliding door 2 is fully closed or fully opened at the start of the processing, and can also be applied to a case where the sliding door 2 is stopped at an arbitrary position between the fully closed state and the fully open state (that is, half-open) at the start of the processing. In the case where the door is half-open, since the sliding door 2 can be moved in any direction, the processing in step S20 does not satisfy the prohibition condition even if the direction of the swipe operation is any direction.

As described above, in the present embodiment, the vehicle door opening/closing device 1 controls the opening/closing of the sliding door 2 based on a user operation performed by being in contact with the operation handle 12. The vehicle door opening/closing device 1 includes a detection unit that detects a contact state of the user with the operation handle 12, a door driving unit 70 that opens and closes the sliding door 2, and a door control unit 80 that determines that the swipe operation is the user operation under the condition that the swipe operation and the tap operation are detected by the detection unit. Then, the door control unit 80 controls the door driving unit 70 based on the determined user operation, and opens and closes the sliding door 2.

According to this configuration, by requesting the two-step operation including the swipe operation and the tap operation for determining the swipe operation, it is possible to appropriately determine the validity of the user operation. Therefore, when the user or another person passes the side of the vehicle, even if the arm and the like unintentionally touch the operation handle 12, and there is a sensor output similar to the swipe operation, the erroneous detection of the sensor output as the swipe operation is suppressed. Accordingly, a highly reliable system can be provided.

In the present embodiment, the tap operation for determining the swipe operation is performed after the swipe operation. However, the order may be reversed. That is, the validity of the swipe operation may be determined under the condition that the swipe operation is performed after the tap operation for determining the swipe operation.

In addition, in the present embodiment, as the user operation (a second operation) for determining the swipe operation (a first operation involving a direction), the tap operation for tapping the surface of the operation handle 12 is illustrated. However, the second operation is not limited to the tap operation, and various operations such as the swipe operation in the same direction and a double-tap operation may be used.

The second operation may be merely the tap operation, but may be the tap operation restricted to a specific position (a handle front end, a handle rear end, a handle center, and the like) of the operation handle 12. For example, the tap operation at the handle end portion located on an opposite side to the direction of the first operation is treated as a valid second operation. Normally, when the user or another person passes the lateral side of the vehicle, the passing direction is only one direction. Therefore, since the execution position of the second operation is opposite to the direction of the first operation, the passage of merely a human body and the second operation can be appropriately distinguished from each other.

In the present embodiment, the door control unit 80 detects the swipe operation and the tap operation, and determines that the swipe operation is the user operation under the condition that an interval between the swipe operation and the tap operation is equal to or longer than the operation transition time (predetermined determination time).

According to this configuration, the user is required to release the hand from the operation handle 12 for a certain period of time or more in the transition from the swipe operation to the tap operation. Accordingly, it is possible to distinguish whether a series of operations from the swipe operation to the tap operation occurred accidentally or under the intention of the user. As a result, since the occurrence of the erroneous detection can be suppressed, the highly reliable system can be provided.

In order to allow the user to recognize the operation transition time, processing of outputting an alarm sound over the operation transition time or outputting an alarm sound at an elapsed timing of the operation transition time may be added. Accordingly, it is possible to provide guidance on the timing of the transition from the swipe operation to the tap operation, so that it is possible to provide a user-friendly system for the user.

In the present embodiment, the detection unit includes two electrostatic capacitance sensors 20 arranged along the longitudinal direction of the operation handle 12.

According to this configuration, it is possible to appropriately detect the swipe operation involving a direction. Note that the number of the electrostatic capacitance sensors may be three or more as long as the swipe operation can be detected. Further, a single electrostatic capacitance sensor 20 may be used as long as the swipe operation and the direction thereof can be detected.

The opening/closing device according to the present embodiment has been described above, but the present invention is not limited to the embodiment described above, and various modifications can be made within the scope of the present invention. For example, the door opening/closing device may be applied to a sliding door installed in a building or a facility, in addition to being applied to a sliding door for a vehicle.

The operation detection device that functions as a part of the door opening/closing device also functions as a part of the present invention. That is, the operation detection device detects the user operation performed by being in contact with the operation unit, and includes the detection unit provided in the operation unit and configured to detect the contact state of the user with the operation unit, and the control unit configured to determine that the first operation is the user operation under the condition that the first operation involving the direction and the second operation different from the first operation are detected in the detection unit.

Further, in the door opening/closing device and the operation detection device, the operation unit may be not only the operation handle serving as a handle during the opening/closing operation of the door, but also a dedicated portion that performs only the contact operation.

Further, in the present embodiment, the swipe operation involving linear movement has been described, but the aspect of the present invention is not limited as long as the contact operation involving a direction, which is performed along the shape of the operation unit, is detected. For example, when the operation unit has a shape bent in an L shape, the present invention is also applicable to an operation of moving the finger in any direction along the shape of the operation unit.

This application is based on a Japanese Patent Application (JP 2018-002390) filed on Jan. 11, 2018, the contents of which are incorporated herein by reference.

DESCRIPTION OF REFERENCE NUMERALS AND SIGNS

1 vehicle door opening/closing device
2 sliding door
3 door lock device
10 door handle device
11 handle base
12 operation handle
12*a* grip portion
12*b* hollow portion
13 front cover
14 back cover
20 electrostatic capacitance sensor
21 sensor electrode
22 control board
24 spacer
30 antenna
40 sensor input unit
50 authentication unit
60 lock driving unit
70 door driving unit
80 door control unit (control unit)
K portable device

What is claimed is:

1. An operation detection device comprising:
an operation unit;
a detection unit provided in the operation unit and configured to detect a contact state of a user with the operation unit; and
a control unit,
wherein the control unit is configured to determine that a first operation involving a direction is a user operation in which the user comes into contact with the operation unit, when the detection unit detects the first operation and a second operation,
wherein the first operation is a swipe operation tracing a surface of the operation unit along a shape of the operation unit,
wherein the control unit is configured to determine that the first operation is the user operation when the detection unit detects a first interval between the first operation and the second operation is equal to or longer than a first predetermined determination time,
wherein the first interval indicates a time period in which a hand of the user is released from the operation unit, and
wherein the control unit is configured to determine that the first operation is not the user operation when it is detected that a second interval between the first operation and the second operation is equal to or longer than a second predetermined determination time set to be longer than the first predetermined determination time, and
wherein a determination by the control unit that the first operation is the user operation includes determining that the first operation is the user operation when it is detected that the second interval is shorter than the second predetermined determination time.

2. The operation detection device according to claim 1,
wherein the second operation is a tap operation tapping the surface of the operation unit.

3. An operation detection method comprising:
detecting a contact state of a user with an operation unit; and
determining that a first operation involving a direction is a user operation in which the user comes into contact with the operation unit, when detecting the first operation and a second operation,
wherein the determining that the first operation is the user operation includes determining that the first operation is the user operation when detecting that a first interval between the first operation and the second operation is equal to or longer than a first predetermined determination time,
wherein the first operation is a swipe operation tracing a surface of the operation unit along a shape of the operation unit, and
wherein the first interval indicates a time period in which a hand of the user is released from the operation unit, and
the method further comprises:
determining that the first operation is not the user operation when it is detected that a second interval between the first operation and the second operation is equal to or longer than a second predetermined determination time set to be longer than the first predetermined determination time, and
wherein the determining that the first operation is the user operation includes determining that the first operation is the user operation when it is detected that the second interval is shorter than the second predetermined determination time.

4. The operation detection method according to claim 3,
wherein the second operation is a tap operation tapping the surface of the operation unit.

5. A door opening/closing device of a sliding door disposed on a lateral side of a vehicle to be movable in a vehicle front-rear direction, the door opening/closing device comprising:
an operation handle disposed on an outside of the sliding door along the vehicle front-rear direction;
a detection unit including a plurality of electrostatic capacitance sensors arranged in the operation handle along the vehicle front-rear direction and configured to detect a contact state of a user with the operation handle;
a door driving unit configured to open or close the sliding door provided with the detection unit; and
a control unit,
wherein the detection unit is configured to detect a first operation which is a swipe operation tracing a surface of the operation handle along a shape of the operation handle and a second operation for determining a validity of the first operation,
wherein the detection unit is configured to detect the swipe operation and a direction of the swipe operation by detecting a finger of the user sequentially passing on the plurality of electrostatic capacitance sensors,
wherein the control unit is configured to determine that the first operation is a user operation in which the user comes into contact with the operation handle, when the detection unit detects the first operation and a second operation,
wherein the control unit is configured to control the door driving unit and open or close the sliding door provided with the operation handle on which the first operation and the second operation are detected to be performed based on the user operation,
wherein the door driving unit is configured to drive the sliding door in an opening direction of the sliding door when the swipe operation is performed in the opening direction, and to drive the sliding door in a closing direction of the sliding door when the swipe operation is performed in the closing direction,
wherein the control unit is configured to determine that the first operation is the user operation when the detection unit detects a first interval between the first operation and the second operation is equal to or longer than a first predetermined determination time,
wherein the first interval indicates a time period in which a hand of the user is released from the operation handle,
wherein the control unit is configured to determine that the first operation is not the user operation when the detection unit detects a second interval between the first operation and the second operation is equal to or longer than a second predetermined determination time set to be longer than the first predetermined determination time, and
wherein the control unit is configured to determine that the first operation is the user operation when the detection unit detects the second interval is shorter than the second predetermined determination time.

6. The door opening/closing device according to claim 5,
wherein the second operation is a tap operation tapping the surface of the operation handle.

7. A door opening/closing method of opening/closing a sliding door which is disposed on a lateral side of a vehicle to be movable in a vehicle front-rear direction, wherein the vehicle includes an operation handle disposed on an outside of the sliding door along the vehicle front-rear direction and a detection unit including a plurality of electrostatic capacitance sensors arranged in the operation handle along the vehicle front-rear direction and configured to detect a contact state of a user with the operation handle, the door opening/closing method comprising:

detecting a finger of the user sequentially passing on the plurality of electrostatic capacitance sensors and detecting a swipe operation and a direction of the swipe operation, determining that a first operation which is the swipe operation tracing a surface of the operation handle along a shape of the operation handle is a user operation in which the user comes into contact with the operation handle, when detecting the first operation and a second operation for determining a validity of the first operation;

opening or closing the sliding door provided with the operation handle on which the first operation and the second operation are detected to be performed based on the user operation, driving the sliding door in an opening direction of the sliding door when the swipe operation is performed in the opening direction;

driving the sliding door in a closing direction of the sliding door when the swipe operation is performed in the closing direction;

determining that the first operation is the user operation when detecting a first interval between the first operation and the second operation is equal to or longer than a first predetermined determination time, wherein the first interval indicates a time period in which a hand of the user is released from the operation handle;

determining that the first operation is not the user operation when it is detected that a second interval between the first operation and the second operation is equal to or longer than a second predetermined determination time set to be longer than the first predetermined determination time, and wherein the determining that the first operation is the user operation includes determining that the first operation is the user operation when it is detected that the second interval is shorter than the second predetermined determination time.

8. The door opening/closing method according to claim 7, wherein the second operation is a tap operation tapping the surface of the operation handle.

* * * * *